J. A. HUDGENS.
CRUDE OIL BURNER.
APPLICATION FILED FEB. 14, 1917.
1,236,305.
Patented Aug. 7, 1917.
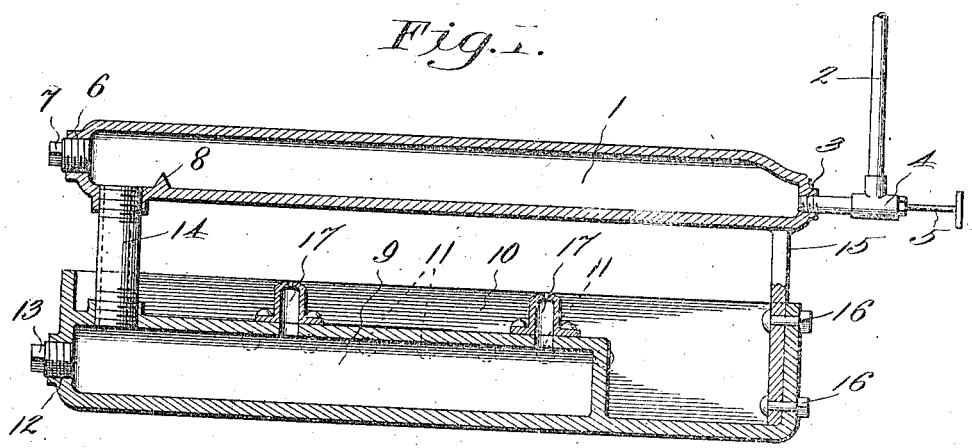
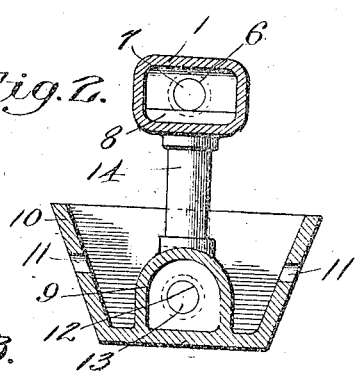
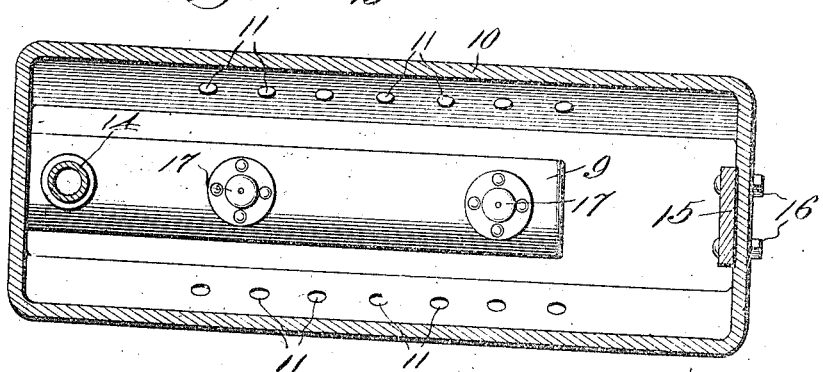
WITNESSES
INVENTOR
J. A. Hudgens,
BY Victor J. Evans
ATTORNEY

UNITED STATES PATENT OFFICE.

JOHN ALBERT HUDGENS, OF PINELAND, TEXAS.

CRUDE-OIL BURNER.

1,236,305.  Specification of Letters Patent.  Patented Aug. 7, 1917.

Application filed February 14, 1917. Serial No. 148,550.

*To all whom it may concern:*

Be it known that I, JOHN ALBERT HUDGENS, a citizen of the United States, residing at Pineland, in the county of Sabine and State of Texas, have invented new and useful Improvements in Crude-Oil Burners, of which the following is a specification.

This invention is an improved burner for use especially in the fire-box of a cook stove or heating stove or the like for cooking and heating purposes, and especially adapted for vaporizing and burning liquid fuel of low grade such as crude oil, the object of the invention being to provide an improved burner of this class which is extremely cheap and simple in construction, which is strong and durable, which is not likely to get out of order, which requires very little attention, is safe from danger of explosion or the like and which enables crude oil to be used for heating and cooking purposes.

The invention consists in the construction, combination and arrangement of devices hereinafter described and claimed.

In the accompanying drawings:—

Figure 1 is a vertical longitudinal sectional view of a crude oil burner constructed and arranged in accordance with my invention.

Fig. 2 is a transverse vertical sectional view of the same.

Fig. 3 is a horizontal sectional view of the same.

In the embodiment of my invention I provide a generating chamber 1, which in practice is preferably a hollow casting and which is of oblong rectangular form with its corners rounded. A fuel supply pipe 2 which leads from a suitable tank or other reservoir is connected to the front end of the generating chamber as at 3 and embodies a T 4 which is provided with a controlling valve 5 which is here shown as a needle valve. The generating chamber is provided in its rear end wall with a clean out opening 6 in which a closure plug 7 is placed. On the bottom of the generating chamber, at a point near the rear end thereof is an upwardly extending transversely arranged bridge 8.

I also provide a burner chamber 9 which in practice is a casting and which is formed integrally with a generating pan 10 the burner chamber being formed on the bottom of the pan, spaced from the front end of the pan and extending to the rear end wall thereof. The side walls of the generating pan are inclined and converge downwardly and are provided with a suitable number of draft openings 11 of suitable size. The rear end wall of the burner chamber is provided with a clean out opening 12 which is closed by a plug 13.

The generating chamber is arranged above the burner chamber in spaced relation thereto and is connected to the burner chamber by a vertically arranged pipe nipple 14 the upper end of which is screwed in an opening in the bottom of the generating chamber and the lower end of which is screwed in an opening in the upper side of the burner chamber. The generating chamber is also provided with a supporting leg 15 which is bolted to one end wall of the generating pan as at 16. On its upper side the burner chamber is provided with gas vent jets or nipples 17 which are directed upwardly and cause burning gas jets to be directed against the lower side of the generating chamber to heat the latter and hence vaporize the crude oil which is fed to the generating chamber by the pipe 2.

The valve 5 serves to control the supply of crude oil to the generating chamber and may be adjusted as desired and said valve is the only valve with which the burner is provided and enables the burner to be extinguished at will it being necessary to completely close said valve in order to cut off the supply of crude oil to the generating chamber. The bridge 8 serves to retain the crude oil in the generating chamber until the oil is entirely vaporized and hence nothing but vapor or gas passes from the generating chamber through the nipple 14 to the burner chamber.

To start the burner in operation the valve 5 is opened sufficiently to cause the generating chamber to be supplied with crude oil and a small quantity of crude oil or other liquid hydrocarbon is placed in the generating pan and ignited to initially heat the generating chamber. When the burner has been once started in operating it will continue so to do as long as the valve 5 is kept open.

My improved crude oil burner is used in the fire-box of a cooking or heating stove or furnace the pipe of which serves to carry off any fumes from the burner and the dampers of the stove may be utilized in controlling the action of the burner.

While I have herein shown and described a preferred form of my invention I would have it understood that changes may be made in the form, proportion and constuction of the several parts, without departing from the spirit of my invention and within the scope of the appended claims.

Having thus described my invention, what I claim is:—

A burner of the class described comprising a hollow body forming a generating chamber, a fuel feed pipe connected to the generating chamber, a valve to regulate and control the supply of fuel to the generating chamber, a generating pan, a hollow body in the bottom of the generating pan and connected thereto and forming a burner chamber, said burner chamber being arranged below the generating chamber and being provided with upwardly directed jet tips, a pipe nipple connecting the generating chamber and the burner chamber, and a support for the generating chamber, arranged at one end thereof and detachably bolted to one end wall of the generating pan.

In testimony whereof I affix my signature.

JOHN ALBERT HUDGENS.